UNITED STATES PATENT OFFICE.

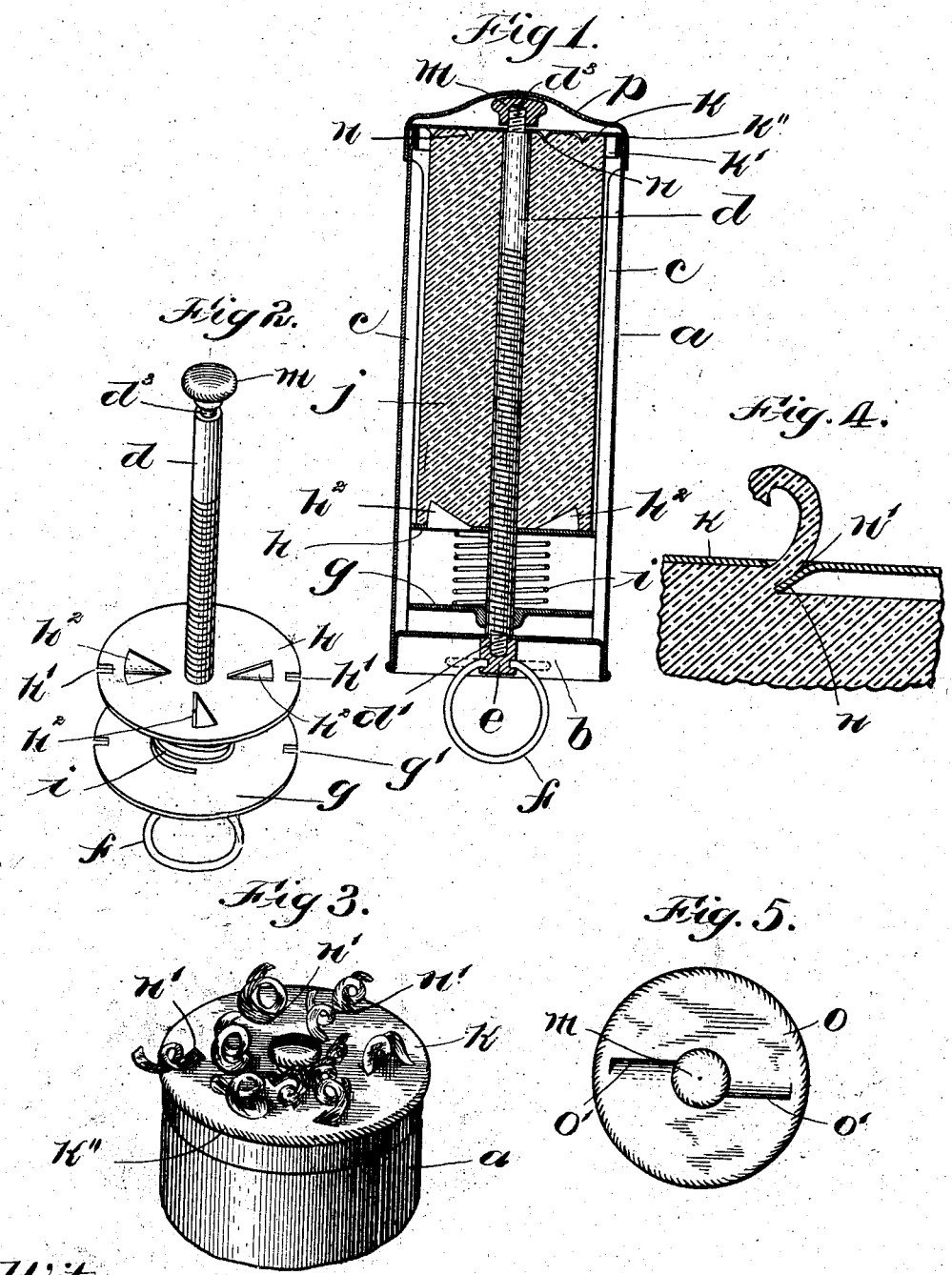

FRANCIS W. WILSON, OF BOSTON, MASSACHUSETTS.

SOAP-HOLDER.

No. 823,572.      Specification of Letters Patent.      Patented June 19, 1906.

Application filed August 9, 1901. Renewed December 1, 1905. Serial No. 289,778.

*To all whom it may concern:*

Be it known that I, FRANCIS W. WILSON, of Boston, in the county of Suffolk and State of Massachusetts, have invented certain new and useful Improvements in Soap-Holders, of which the following is a description sufficiently full, clear, and exact to enable those skilled in the art to which it appertains or with which it is most nearly connected to make and use the same.

The general object of the present invention is to provide a convenient and practical form of holder for toilet soap which will dispense with the necessity of manipulating an entire cake in the application of soap when performing ablutions, but will deliver slivers or strips of the soap in any desired quantity, while the cake itself is inclosed in a holder and does not require handling. I thus propose to do away entirely with the inconvenience and unpleasantness of handling a slippery cake of soap, the slivers or strips delivered being segregated from the cake for use with water, so that no moistening of the cake is necessary and the holder can be kept in dry and clean condition.

In carrying out the invention I employ a cutting-head on the holder, adapted to be rotated by an application of the fingers of one hand thereto, means being provided for maintaining a yielding outward pressure of the soap against the cutting-head and suiting adjustments to the condition of the cake.

Simplicity of construction and ease of manipulation are desiderata which have been duly observed in the evolution of the invention, not only in connection with the delivery of the soap, but also in connection with provisions for replenishing when the cake is exhausted.

Of the drawings which accompany and form part of this specification, Figure 1 represents the holder in longitudinal section. Fig. 2 represents certain interior parts assembled and in perspective. Fig. 3 represents the delivery end of the holder in perspective with the cap removed. Fig. 4 is a fragmentary sectional view, on an exaggerated scale, illustrating the action of the cutting-head on the soap; and Fig. 5 is a plan view of a modified form of cutting-head.

In the drawings the reference-letter $a$ designates the casing of the holder, which is of cylindrical form and constructed with a re-entrant base $b$ and a pair of longitudinal guide-strips $c$ diametrically opposite each other on the interior walls. A rod $d$, formed throughout the greater portion of its length with left-hand screw-threads, extends centrally through the holder, being formed with a reduced end portion $d'$, having right-hand screw-threads and projecting loosely through an opening in the base $b$ and receiving a cap-nut $e$, which is equipped with a swivel-ring $f$ for turning the rod, the ring as well as the nut being contained in the reëntrant part of the base when the holder is to rest in an upright position on a horizontal surface. A circular disk $g$ fits in the casing $a$, being notched, as at $g'$, for engagement with the guide-strips $c$, and this disk is formed centrally as a nut, engaging the left-hand screw-threads of the rod, so that when the rod is turned to the right the disk will be moved away from the base $b$. Another disk $h$ loosely surrounds the rod beyond the disk $g$ and is similarly notched, as at $h'$, for engagement with the guide-strips $c$, this disk being formed with a series of radial blades $h^2$, projecting outwardly at right angles. A spiral spring $i$ surrounds the rod $d$ between the two disks, its function being to press the disk $h$ toward the delivery end of the holder. This disk constitutes a back-rest for the soap, which is in the form of a cylindrical cake $j$, with a hole through the center to accommodate the rod, the cake being held from turning by the blades $h^2$.

The delivery end of the holder-casing receives the flange $k'$ of a rotary head $k$, which fits over a reduced end portion $d^3$ of the rod $d$ and is confined by a cap-nut $m$ engaging right-hand screw-threads on said end portion. This rotary head has a peripheral flange $k''$ projecting over the edge of the holder-casing, the same being milled, so that it can be grasped readily for the purpose of turning the head. The latter is formed with a considerable number of cutting points or blades $n$, which may be produced by striking up triangular portions of the head, so that they project inwardly at an angle, leaving openings $n'$. It will be seen that rotation of the head $k$ in one direction while the soap is pressed against its inner side will cause the points $n$ to cut strips or slivers from the soap and that the latter will issue through the opening $n'$, the action being illustrated in detail in Fig. 4 and the general effect shown in Fig. 3. I prefer to locate the cutting-points in staggered relation, as shown, so that they will act throughout the end surface of the cake of soap, one blade removing the ridge left between two preceding blades.

Instead of the multiple of cutting-points for delivering the soap in slivers the cutting-head may have one or more radial blades equal in length to the soap radius. Fig. 5 illustrates such a construction, in which the reference-letter $o$ designates the head and $o'$ the blades formed by striking up portions of the head. With this form of cutter the soap would issue in thin strips.

In operation the holder can be conveniently held in one hand while the cutting-head is rotated with the other hand, and when the soap slivers or strips have issued in sufficient quantity a slight backward turn of the head will sever them and they can be caught in the hand that manipulates the cutter. As the cake of soap diminishes in use the rod is turned by manipulation of the ring $f$, so as to advance the follower-disk $g$, and thereby preserve the necessary spring-pressure on the soap. When replenishment becomes necessary, the cap-nut $m$ is removed and then the cutting-head taken off and the remnant of soap thrown out. By temporarily replacing the cap-nut it can be conveniently employed to turn the screw-rod and restore the follower $g$ to its position at the base of the holder. Then this nut is again removed, the fresh cake of soap introduced, and the cutting-head replaced, after which the cap-nut is screwed on to confine the latter.

A cap $p$ is preferably fitted to the delivery end of the holder, so as to cover the cutting-head when the holder is not in use, this adjunct being more especially for application when the holder is utilized as a traveler's companion.

It will be seen that the form of means here shown and described is well calculated to thoroughly fulfil the objects primarily stated. It is, however, to be understood that various modifications may be made without involving a departure from the spirit and scope of the invention.

Having thus described my invention, what I claim as new is as follows:

1. A soap-holder comprising a casing; a rotary cutting-head fitting over one end thereof; a screw-threaded rod mounted to rotate in the casing independent of said cutting-head, a follower on said rod; and a spring engaged with the said follower and adapted to press the soap against the cutting-head, substantially as described.

2. A soap-holder comprising a casing; a rotary cutting-head fitting thereover; a rotatable screw-threaded rod extending through the casing and mounted to rotate independent of said cutting-head, a sliding back-rest for the soap; a follower engaged with the screw-threads of the rod and held from turning, and a spring between the follower and the back-rest.

3. A soap-holder comprising a casing; a rotary cutting-head fitting over one end thereof; a screw-threaded rod journaled at one end in the base of the casing and at the other end in the cutting-head whereby the same is free to rotate independent of said head, said rod having manipulative devices on its ends for turning it; a soap back-rest slidably mounted in the casing and on the rod; an adjustable follower slidably mounted within the casing and engaged as a nut with the rod; and a spring interposed between the follower and the back-rest, substantially as and for the purpose described.

4. In a soap-holder the combination of an inclosing casing; a rotary cutting-head removably mounted on one end of the same; a screw-threaded rod longitudinally disposed in the casing and having its ends rotatably mounted in said head and the base of said casing, whereby said rod is free to rotate independent of said head, removable end pieces on said rod for confining the same in its operating position and likewise confining the cutting-head, and also for supplying manipulative means by which to turn the rod; a sliding back-rest for the soap loosely surrounding the rod; a sliding follower engaging the screw-threads of the latter; and a spring interposed between the follower and the back-rest.

5. In a soap-holder the combination of an inclosing casing; a rotary cutting-head removably mounted on one end of the same; a screw-threaded rod longitudinally disposed in the casing and having its ends rotatably mounted in said head and the base of said casing, whereby said rod is free to rotate independent of said head, said end portions being screw-threaded reversely to the body of the rod; nuts engaging the end portions to confine the rod and the cutting-head in place and to constitute manipulative means for turning the rod; a follower having a nut formation engaging the rod; a spring engaging said follower; and a back-rest for the soap surmounting said spring.

In testimony whereof I have signed my name to this specification, in the presence of two subscribing witnesses, this 2d day of August, A. D. 1901.

FRANCIS W. WILSON.

Witnesses:
 JOHN MURRAY MARSHALL,
 FRANK PARKER DAVIS.